(12) United States Patent
Vu et al.

(10) Patent No.: US 8,106,987 B1
(45) Date of Patent: Jan. 31, 2012

(54) CORRELATED DOUBLE SAMPLING PING-PONG ARCHITECTURE

(75) Inventors: Ha Chu Vu, San Jose, CA (US); Seema Varma, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 703 days.

(21) Appl. No.: 11/770,574

(22) Filed: Jun. 28, 2007

(51) Int. Cl.
*H04N 5/335* (2006.01)
(52) U.S. Cl. .......................... 348/311; 348/241; 341/155
(58) Field of Classification Search .................. 348/311, 348/241; 341/155
See application file for complete search history.

(56) References Cited

U.S. PATENT DOCUMENTS

| | | | | |
|---|---|---|---|---|
| 6,587,143 B1* | 7/2003 | Boisvert | ......................... | 348/241 |
| 7,236,117 B1* | 6/2007 | Varma et al. | .................. | 341/155 |
| 7,453,389 B1* | 11/2008 | Vu et al. | ......................... | 341/172 |
| 7,671,779 B1* | 3/2010 | Guidry et al. | .................. | 341/172 |
| 2001/0008420 A1* | 7/2001 | Opris | ............................. | 348/223 |

OTHER PUBLICATIONS

LM98714 Three Channel, 16-Bit, 45 MSPS Digital Copier Analog Front End with Integrated CCD/CIS Sensor Timing Generator and LVDS Output, *National Semiconductor Corporation*, Oct. 2006, pp. 1-12.

* cited by examiner

*Primary Examiner* — Usman Khan

(57) ABSTRACT

A method and apparatus can be arranged with a correlated double sampler circuit (CDS) for processing an output signal from an imaging device such as a charge-coupled device (CCD) image sensor. The correlated double sampling (CDS) circuit is described that includes an amplifier and a reduced number of capacitors that are dynamically configured using a ping-pong architecture. The described ping-pong architecture has relaxed requirements for sampling points, minimized gain mismatch error, and offset mismatches can be easily managed. The ping-pong architecture is useful in digital imaging applications such as digital scanners, digital copiers, digital cameras, and digital camcorders, to name a few.

20 Claims, 13 Drawing Sheets

CORRELATED DOUBLE SAMPLING PING-PONG ARCHITECTURE

FIELD OF INVENTION

The present description relates to a method and apparatus for processing an output signal from an imaging device such as a charge-coupled device (CCD) image sensor. More particularly, a correlated double sampling (CDS) circuit is described that includes an amplifier and a reduced number of capacitors that are dynamically configured using a ping-pong architecture. The described ping-pong architecture has relaxed requirements for sampling points and minimized gain mismatch error, and offset mismatches can be easily managed.

BACKGROUND

CCD image sensors are widely used to convert images into electronic signals that can be captured, transmitted, stored and displayed. Digital imaging devices such as digital image scanners, digital video cameras and digital still cameras typically use CCDs.

A CCD divides an image into a large number of discrete cells or pixels that are often arranged as an array of rows or lines. During an exposure interval, each pixel in the array is arranged to convert incident light into electrons, which form a current that is integrated by a capacitor. The current flow is proportional to the intensity of the exposure of the pixel. At the end of the exposure interval, the accumulated charge for each pixel in the array corresponds to the scanned image. Prior to the next exposure interval, the pixels are reset to the "reset level" by initializing the capacitors to a specified voltage. The reset level and the charge accumulated for each pixel are transferred to an output port so that the resulting image can be processed.

An analog processing stage senses the output signal and removes the reset level from the image during a readout interval. The reset level varies over temperature due to thermal noise, and also varies from part to part due to processing variations. The reset level represents the voltage that is present when no light is incident on a pixel (i.e., the black level for the pixel). During the readout interval, the output signal includes the reset level followed by the signal level for the pixel. The difference between the signal level and the reset level indicates the amount of light (typically of a particular color) that has been impressed upon one particular pixel of the image sensor.

DETAILED DESCRIPTION

Figure 1:
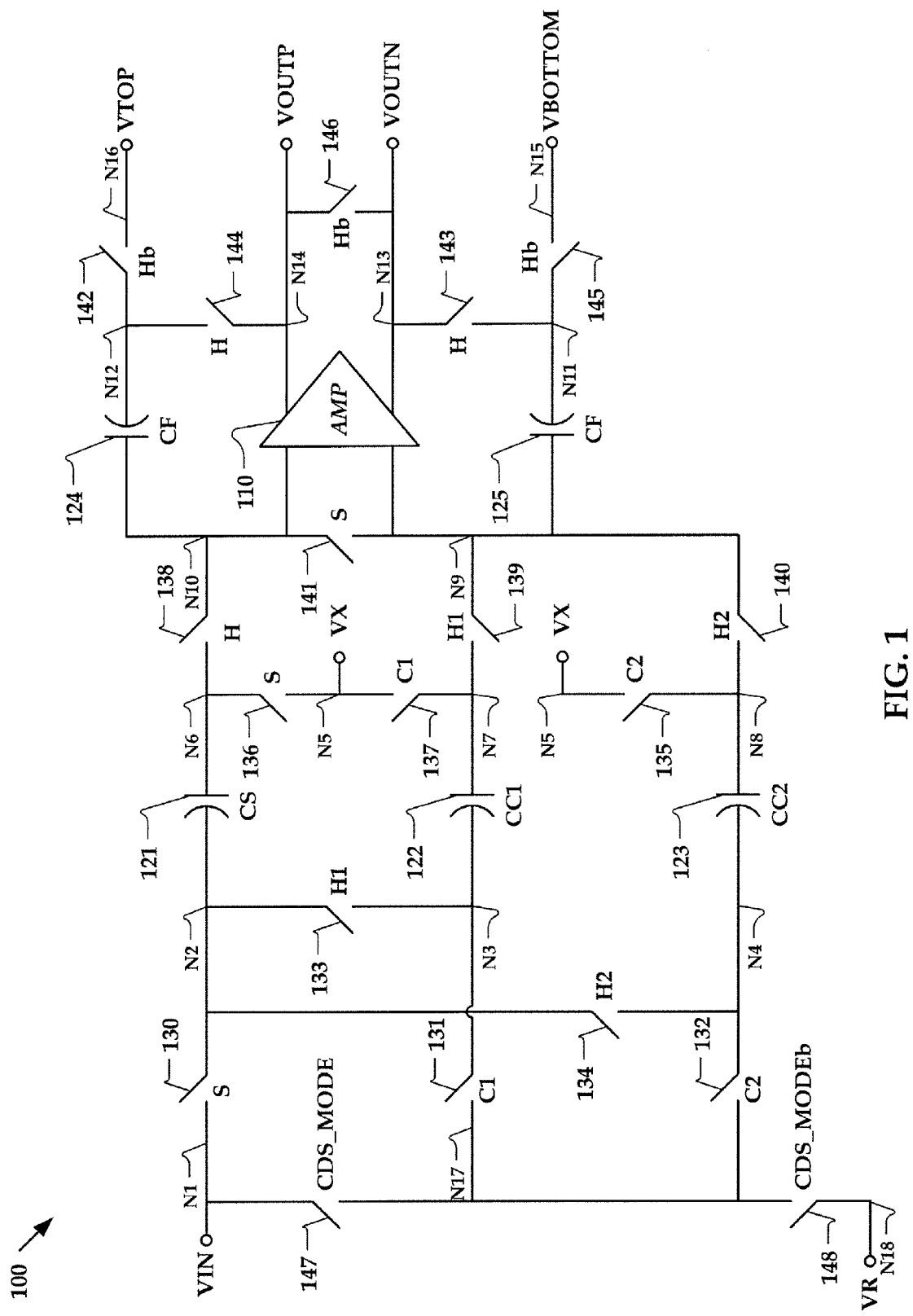
FIG. 1 is a schematic diagram of an example correlated double sampler circuit that employs a ping-pong architecture.

Various embodiments will be described in detail with reference to the drawings, where like reference numerals represent like parts and assemblies throughout the several views. References to various embodiments do not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," and "the" may include reference to both the singular and the plural. The meaning of "in" may include "in" and "on." The term "connected" may mean a direct electrical, electro-magnetic, mechanical, logical, or other connection between the items connected, without any electrical, mechanical, logical or other intermediary items. The term "coupled" can mean a direct connection between items, an indirect connection through one or more intermediaries, or communication between items in a manner that may not constitute a physical connection. The term "circuit" can mean a single component or a plurality of components, active and/or passive, discrete or integrated, that are coupled together to provide a desired function. The term "signal" can mean at least one current, voltage, charge, data or other such identifiable quantity including electrically coupled and magnetically coupled signals.

Briefly stated, the present disclosure relates to a method and apparatus that can be arranged with a correlated double sampling (CDS) circuit for processing an output signal from an imaging device such as a charge-coupled device (CCD) image sensor. A correlated double sampling (CDS) circuit is described that includes an amplifier and a reduced number of capacitors that are dynamically configured using a ping-pong architecture. The described ping-pong architecture has relaxed requirements for sampling points and minimized gain mismatch error, and offset mismatches can be easily managed. The ping-pong architecture is useful in digital imaging applications such as digital scanners, digital copiers, digital cameras, and digital camcorders, to name a few.

Correlated Double Sampling Ping-Pong Architecture

FIG. 1 is a schematic diagram of an example correlated double sampler (CDS) circuit 100 that employs a ping-pong architecture in accordance with the present disclosure. CDS circuit 100 includes an amplifier circuit 110, capacitor circuits 121-125, and switch circuits 130-148.

Amplifier circuit 110 includes a first input terminal coupled to node N10, a second input terminal coupled to node N9, a first output terminal coupled to node N14, and a second output terminal coupled to node N13.

Capacitor circuit 121 is coupled between nodes N2 and N6, and has a value designated as CS. Capacitor circuit 122 is coupled between nodes N3 and N7, and a value designated as CC1. Capacitor circuit 123 is coupled between nodes N4 and N8, and has a value designated as CC2. Capacitor circuit 124 is coupled between nodes N10 and N12, and has a value designated as CF. Capacitor circuit 125 is coupled between nodes N11 and N9, and has a value designated as CF.

Switch circuit 130 is coupled between nodes N1 and N2, and has a control terminal that is responsive to signal S. Switch circuit 131 is coupled between nodes N17 and N3, and has a control terminal that is responsive to signal C1. Switch circuit 132 is coupled between nodes N17 and N4, and has a control terminal that is responsive to signal C2. Switch circuit 133 is coupled between nodes N2 and N3, and has a control terminal that is responsive to signal H1. Switch circuit 134 is coupled between nodes N2 and N4, and has a control terminal that is responsive to signal H2. Switch circuit 135 is coupled between nodes N5 and N8, and has a control terminal that is responsive to signal C2. Switch circuit 136 is coupled between nodes N5 and N6, and has a control terminal that is responsive to signal S. Switch circuit 137 is coupled between nodes N5 and N7, and has a control terminal that is responsive to signal C1. Switch circuit 138 is coupled between nodes N6 and N10, and has a control terminal that is responsive to signal H. Switch circuit 139 is coupled between nodes N7 and N9, and has a control terminal that is responsive to signal H1. Switch circuit 140 is coupled between nodes N8 and N9, and has a control terminal that is responsive to signal H2. Switch circuit 141 is coupled between nodes N9 and N10, and has a control terminal that is responsive to signal S. Switch circuit 142 is coupled between nodes N12 and N16, and has a control terminal that is responsive to signal Hb. Switch circuit 143 is coupled between nodes N11 and N13, and has a control terminal that is responsive to signal H. Switch circuit 144 is coupled between nodes N12 and N14, and has a control terminal that is responsive to signal H. Switch circuit 145 is coupled between nodes N11 and N15, and has a control terminal that is responsive to signal Hb. Switch circuit 146 is coupled between nodes N13 and N14, and has a control terminal that is responsive to signal Hb. Switch circuit 147 is coupled between nodes N1 and N17, and has a control terminal that is responsive to signal CDS_MODE. Switch circuit 148 is coupled between nodes N18 and N17, and is responsive to signal CDS_MODEb.

Control signal S is asserted to selectively couple node N1 to node N2 via switching circuit 130. Control signal C1 is asserted to selectively couple node N17 to node N3 via switching circuit 131. Control signal C2 is asserted to selectively couple node N17 to node N4 via switching circuit 132. Control signal CDS_MODE is asserted to selectively couple node N1 to node N17. Control signal CDS_MODEb, which is inversely related to control signal CDS_MODE, is asserted to selectively couple node N18 node N17. Nodes N2 and N3 are selectively coupled together by switch circuit 133 in response to control signal H1. Nodes N2 and N4 are selectively coupled together by switch circuit 134 in response to control signal H2. Node N5 is selectively coupled to node N8 by switch circuit 135 in response to control signal C2. Node N5 is selectively coupled to node N6 by switch circuit 136 in response to control signal S. Node N5 is selectively coupled to node N7 by switch circuit 137 in response to control signal C1. Node N6 is selectively coupled to node N10 by switch circuit 138 in response to control signal H. Node N7 is selectively coupled to node N9 by switch circuit 139 in response to control signal H1. Node N8 is selectively coupled to node N9 by switch circuit 140 in response to control signal H2. Node N9 is selectively coupled to node N10 by switch circuit 141 in response to control signal S. Node N12 is selectively coupled to node N16 by switch circuit 142 in response to control signal Hb. Node N11 is selectively coupled to node N13 by switch circuit 143 in response to control signal H. Node N12 is selectively coupled to node N14 by switch circuit 144 in response to control signal H. Node N11 is selectively coupled to node N15 by switch circuit 145 in response to control signal Hb. Nodes N13 and N14 are selectively coupled together by switch circuit 146 in response to control signal Hb.

The amplifier circuit 110 is arranged to sense signals that are applied across the input terminals at nodes N9 and N10, and provide amplification in response thereto that is differentially observed across the output terminals at nodes N14 and N13. Signals VOUTP and VOUTN correspond to the signals at nodes N14 and N13, respectively. Amplifier circuit 110 can be any reasonable implementation including a fully-differential operational amplifier circuit.

Signal CDS_MODE is a mode control signal that is asserted when circuit 100 is operated in a correlated double sampling mode and de-asserted when circuit 100 is operated in a sample and hold mode. The switch circuits 147 and 148 operate as a multiplexer circuit with two inputs and one output. The first input of the multiplexer circuit is node N1, while the second input of the multiplexer circuit is node N18. The output of the multiplexer circuit is node N17. An input signal VIN is coupled to node N1, while a reference signal VR is coupled to node N18. Signal CDS_MODEb is inversely related to signal CDS_MODE so that switch circuit 147 is always in an opposite switching configuration with respect to switch circuit 148.

The multiplexer circuit formed by switch circuits 147 and 148 is configured for operation in either a correlated double sampling mode or a sample and hold mode. In the correlated double sampling mode, switch circuit 147 is operated in a closed circuit configuration, and input signal VIN is selectively coupled to sampling capacitor circuits 121-123 via their respective switch circuits 130-132. In the sample and hold mode, switch circuit 148 is operated in a closed circuit configuration such that signal VIN is selectively coupled to capacitor circuit 121 via switch circuit 130 and also so that switch circuits 131 and 132 selectively couple reference signal VR to capacitor circuits 122 and 123. Switch circuit 147 is operated in an open circuit configuration in the sample and hold mode, while switch circuit 148 is operated in an open circuit configuration in the correlated double sampling mode.

Signal VX is applied to node N5, and can be any appropriate voltage that serves as a signal ground. In one example, voltage VX corresponds to a mid-supply voltage such as (VDD−VSS)/2. In another example, voltage VX corresponds to 0V. In still another example, voltage VX corresponds to a common-mode voltage (VCM) that is desired for the amplifier circuit 110. For simplicity, the remaining disclosure refers to the voltage at node N5 as the signal ground.

Signal VTOP is applied to node N16, while signal VBOTTOM is applied to node N15. The voltages associated with VTOP and VBOTTOM are used to initialize the feedback capacitor circuits (i.e., 124, 125) for amplifier circuit 110 during one or more operating phases of the CDS circuit.

Each of the capacitor circuits 121-125 can be implemented as any appropriate circuit arrangement that provides a desired capacitance value. Example capacitor circuits include discrete and integrated capacitors, including but not limited to metal plate capacitors, polysilicon-based capacitors, and transistors that are arranged to operate as capacitors (e.g., gate-drain capacitance). Multiple capacitors can be combined together in a series arrangement, a parallel arrangement, or a combination of series and parallel capacitors to obtain the desired values. In one example, each capacitor 121-125 circuit includes a plurality of unit sized capacitors that are arranged together to provide improved matching of effective capacitance between different capacitor circuits.

Each of the switch circuits 130-148 can be any appropriate switching circuit arrangement including bipolar junction transistor (BJT) circuits, field effect transistor (FET) circuits including junction field effect transistor (JFET) circuits, and metal oxide semiconductor (MOS) circuits. Example switching circuit arrangements can include single transistors (either p-type or n-type) and complementary transistor pair arrangements such as transmission gates, to name a few.

In some example configurations switch circuits 147 and 148 are eliminated and circuit 100 is operable in only the correlated double sampling mode. In this configuration, switch 147 is replaced with a short circuit and switch 148 is replaced with an open circuit.

First Example Configuration

FIGS. 2A-2G are timing diagrams that illustrate various signal waveforms for the correlated double sampler circuit of FIG. 1 when the correlated double sampler mode is active.

Figure 2A:
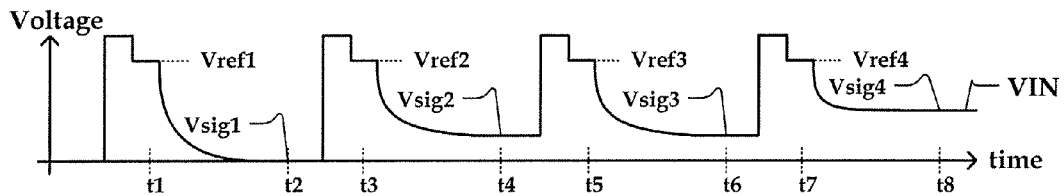
FIGS. 2A-2G are timing diagrams that illustrate various signal waveforms for the correlated double sampler circuit of FIG. 1.

FIG. 2A illustrates an example signal waveform for a CCD image sensor that can serve as the input signal VIN for the CDS circuit 100. The high voltage level that precedes the low level portion of each cycle is commonly called the "reset level", while the lower voltage level is commonly called the "signal level." At times t1, t3, t5, and t7, the input signal VIN has a value corresponding to a respective reset level Vref1, Vref2, Vref3 and Vref4. Although FIG. 2A illustrates that the values for the reset levels are substantially the same, the reset levels can change as a result of thermal noise and other non-ideal effects so that the values are not consistently the same. At times t2, t4, t6, and t8, the input signal VIN has a value corresponding to a respective signal level Vsig1, Vsig2, Vsig3 and Vsig4. The values for the signal levels vary based on exposure time and other factors related to each individual pixel in the CCD array. The difference between a signal level and its preceding reset level indicates the amount of light (typically of a particular color) that has fallen on one particular pixel of the image sensor.

Figure 2B:
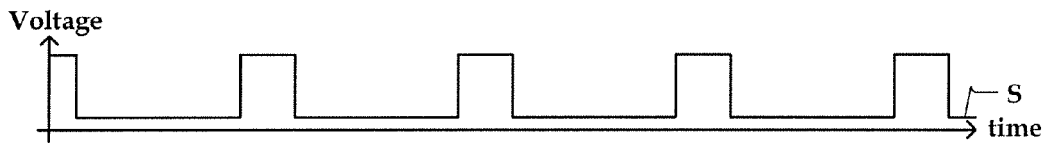
Figure 2C:
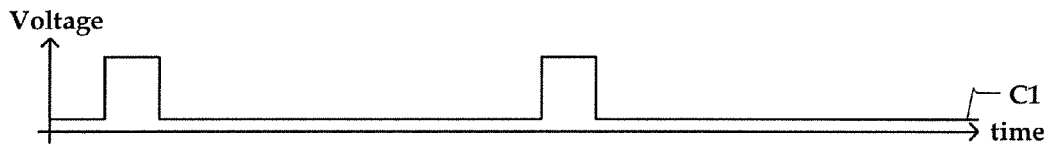
Figure 2D:
Figure 2E:
Figure 2F:
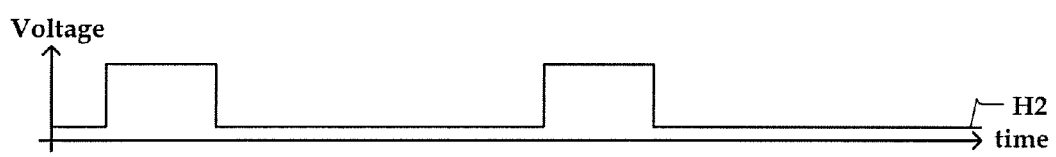
Figure 2G:
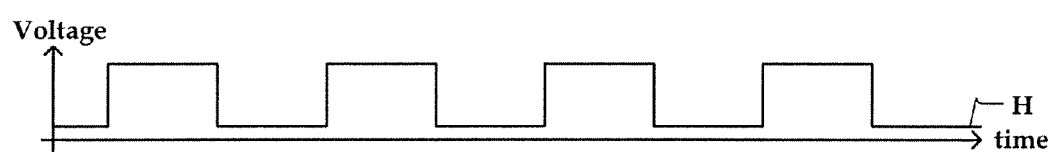

FIG. 2B illustrates an example signal waveform for a first control signal S, which is asserted during the sampling phase of CDS circuit 100 so that the signal level is sampled at the appropriate time. FIG. 2C illustrates an example signal waveform for a second control signal C1, which is asserted for a sampling phase of capacitor circuit 122 (CC1) to set a clamp level for the CDS circuit during a first operating phase (e.g., the "ping" phase). FIG. 2D illustrates an example signal waveform for a third control signal C2, which is asserted for a sampling phase of capacitor circuit 123 (CC2) to set a clamp level for the CDS circuit during a second operating phase (e.g., the "pong" phase). FIG. 2E illustrates an example signal waveform for a fourth control signal H1, which is asserted during a hold operation in the first operating phase. FIG. 2F illustrates an example signal waveform for a fifth control signal (H2), which is asserted during a hold operation in the second operating phase. FIG. 2G illustrates an example signal waveform for a sixth control signal (H) that is asserted for the hold mode for every operating phase. A seventh control signal (Hb, not shown) corresponds to an inverse of the sixth control signal (H).

FIGS. 3A-3D are schematic diagrams that illustrate equivalent circuits for the correlated double sampler circuit of FIG. 1 during operation with the signal waveforms of FIGS. 2A-2G.

Figure 3A:
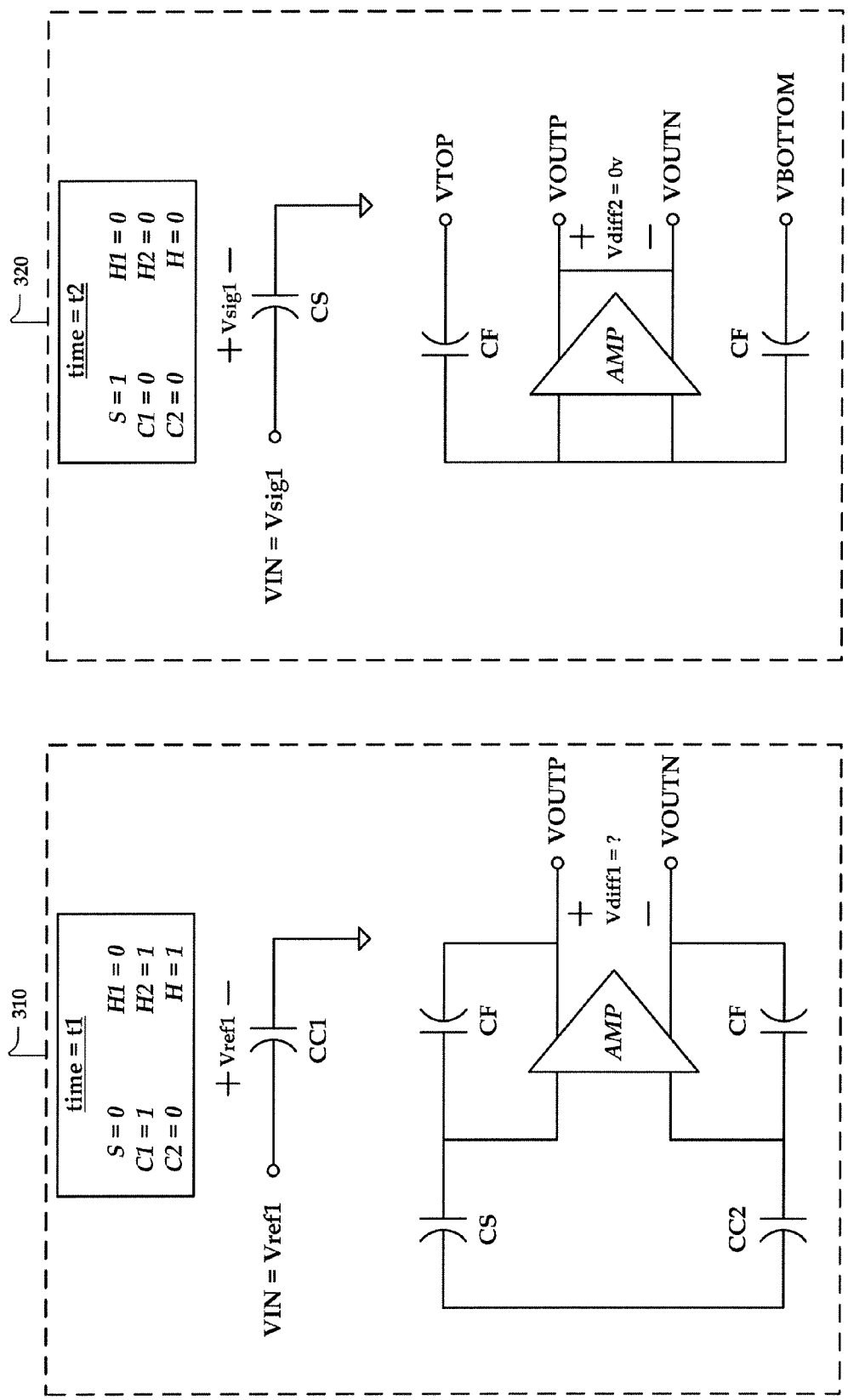
FIGS. 3A-3D are schematic diagrams that illustrate equivalent circuits for the correlated double sampler circuit of FIG. 1 during operation with the signal waveforms of FIGS. 2A-2G.

FIG. 3A illustrates a first equivalent circuit 310 for CDS circuit 100 at time t1, where the control signals have logical values S=0, C1=1, C2=0, H1=0, H2=1 and H=1. At time t1, the amplifier circuit 110 is arranged in a hold configuration with capacitor circuits 121, 123, 124 and 125 and a sampling configuration with capacitor circuit 122. Input signal VIN=Vref1, and the voltage associated with input signal VIN (e.g., a reference level for a first "ping" pixel) is stored on capacitor circuit 122 (CC1). The difference between VOUTP and VOUTN is determined by the reset level (Vref), the signal level (Vsig) of a prior sampling cycle (e.g., signal levels for a prior "pong" pixel), and the relative capacitance values of the capacitor circuits. Assuming the capacitor circuits have equal effective values (i.e. CS=CF=CC2), the output signal (Vdiff1) is determined as Vdiff1=Vsig−Vref. For non-equal values in the capacitor circuits (e.g., CS=A*CF), there is a gain associated with the difference signal as given by: Vdiff1=A[Vsig−Vref]. It is important to note the non-varying (i.e., independent of the input signal VIN) or DC component of the difference between VOUTP and VOUTN is considered separate from the difference signal and is given as: VDC=VTOP−VBOTTOM. Thus, the overall output signal (VOUT) for the CDS circuit 100 is given as: VOUT=VOUTP−VOUTN=Vdiff+VDC. However, for simplicity the DC component is ignored from the remaining discussions, and only the input signal VIN-dependent difference signal Vdiff is described. Also, during the first time (t1), there may be no prior pixel data that has been sampled by capacitor circuits CS and CC2. In this instance, the output (Vdiff) of amplifier circuit 110 at time t1 is ignored.

FIG. 3A also illustrates a second equivalent circuit 320 for CDS circuit 100 at time t2, where the control signals have logical values S=1, C1=0, C2=0, H1=0, H2=0 and H=0. At time t2, the amplifier circuit 110 is arranged in an initialization configuration with capacitor circuits 124 and 125 and a sampling configuration for capacitor circuit 121. Input signal VIN=Vsig1, and the voltage associated with input signal VIN (e.g., the input level for the first "ping" pixel) is stored on capacitor circuit 121. Also, the input terminals of the amplifier circuit 110 are shorted together (e.g., via switch circuit 141), the output terminals of the amplifier circuit 110 are shorted together (e.g., via switch circuit 146), and the feedback capacitor circuits 124 and 125 are initialized by voltages VTOP and VBOTTOM, respectively. The difference between VOUTP and VOUTN is 0V since the output terminals are shorted together.

Figure 3B:
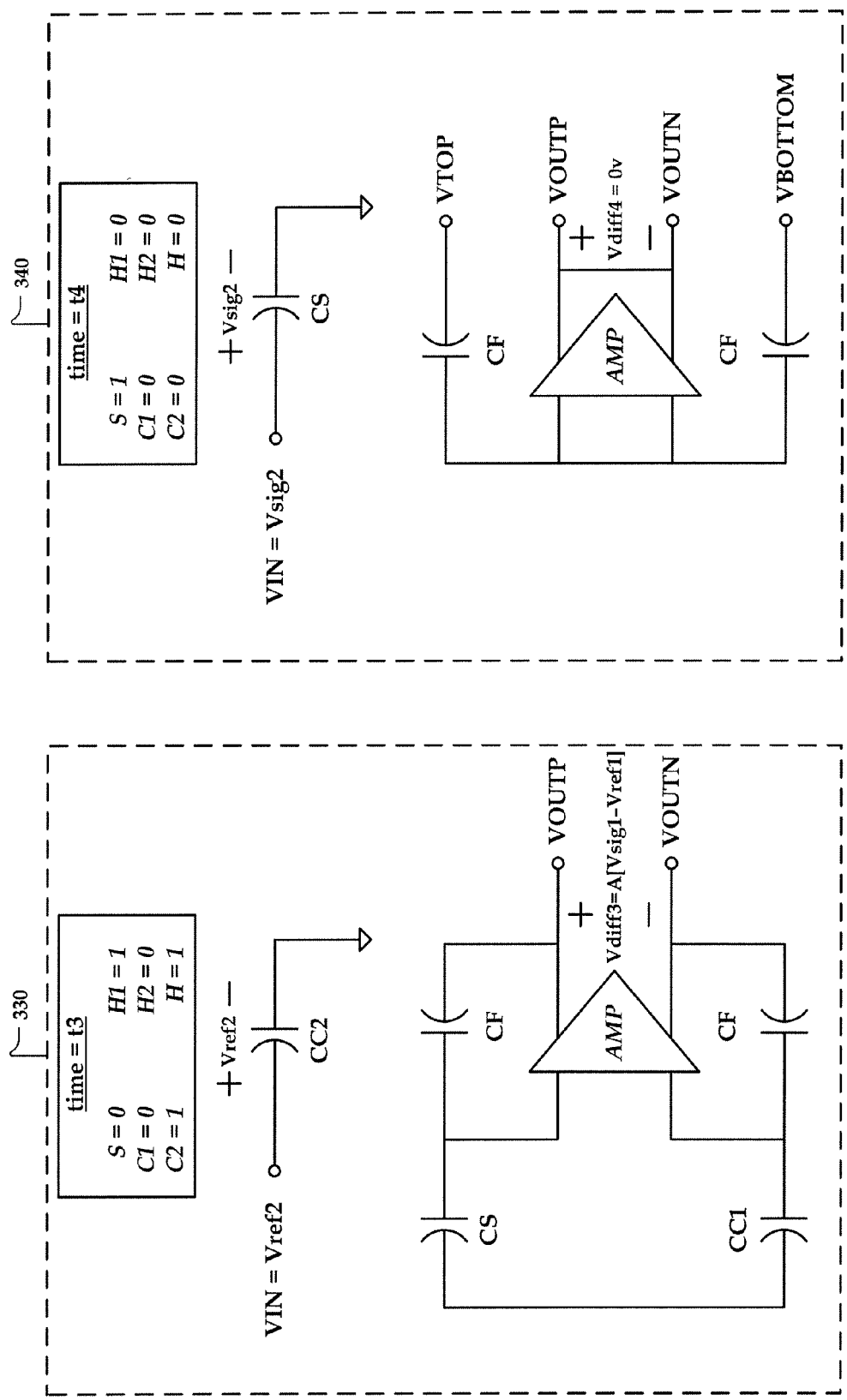

FIG. 3B illustrates a third equivalent circuit 330 for CDS circuit 100 at time t3, where the control signals have logical values S=0, C1=0, C2=1, H1=1, H2=0 and H=1. At time t3, the amplifier circuit 110 is arranged in a hold configuration with capacitor circuits 121, 122, 124 and 125 and a sampling configuration with capacitor circuit 123. Input signal VIN=Vref2 (e.g., a reference level for a first "pong" pixel), and the voltage associated with input signal VIN (e.g., the reference level for the first "pong" pixel) is stored on capacitor circuit 123. For the hold arrangement at this time, the difference between VOUTP and VOUTN is determined by the reset level Vref1 and the signal level Vsig1 of the prior sampling cycle from times t1 and t2 and the relative effective capacitance values of the capacitor circuits. In other words, the hold arrangement at time t3 is arranged to hold the difference in values for the "ping" pixel from times t1 and t2. Assuming the effective capacitance values in this configuration are all equal (e.g., CC1=CF=CS), the difference (Vdiff3) is given as: Vdiff3=Vsig1−Vref1. However, when the capacitor circuits are of non-equal values (e.g., CC1≠CS CF), the difference (Vdiff3) is again gain-scaled according to the relative capacitance values as: Vdiff3=A[Vsig1−Vref1], where A is a scaling factor of CS relative to CF (e.g., CS=A*CF).

FIG. 3B also illustrates a fourth equivalent circuit 340 for CDS circuit 100 at time t4, which is substantially the same as the second equivalent circuit 320 of FIG. 3A where the control signals have logical values S=1, C1=0, C2=0, H1=0, H2=0 and H=0, where the resulting output voltage (Vdiff4) is given as Vdiff4=0V. At time t4, the amplifier circuit 110 is again arranged in the initialization configuration with capacitor circuits 124 and 125, and in a sampling configuration with capacitor circuit 121. The input signal (VIN) has a value given by Vsig2 (e.g., a signal level for the first "pong" pixel) which is sampled by capacitor circuit 121.

Figure 3C:
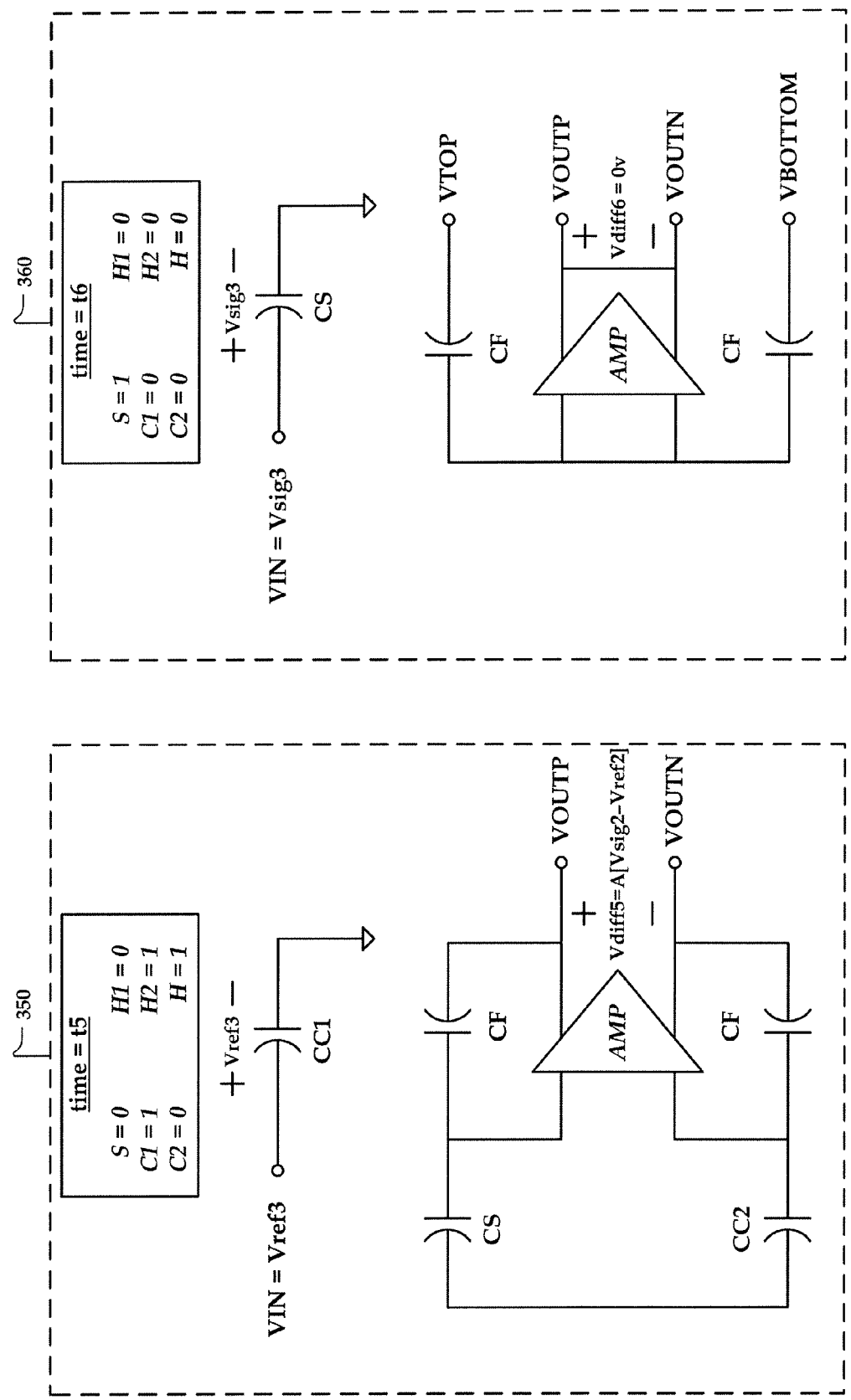

FIG. 3C illustrates a fifth equivalent circuit 350 for CDS circuit 100 at time t5, which is substantially the same as the first equivalent circuit 310 of FIG. 3A where the control signals have logical values S=0, C1=1, C2=0, H1=0, H2=1 and H=1. At time t5, the amplifier circuit 110 is again arranged in the hold configuration with capacitor circuits 121, 123, 124 and 125, and the sampling configuration with capacitor circuit 122. Input signal VIN=Vref3 (e.g., a reference level for a second "ping" pixel) and the output signal from amplifier circuit 110 is given as Vdiff5=A[Vsig2−Vref2], which corresponds to a hold configuration for the first "pong" pixel.

FIG. 3C also illustrates a sixth equivalent circuit 360 for CDS circuit 100 at time t6, which is substantially the same as the second equivalent circuit 320 of FIG. 3A where the control signals have logical values S=1, C1=0, C2=0, H1=0, H2=0 and H=0. At time t6, the amplifier circuit 110 is again arranged in the initialization configuration with capacitor circuits 124 and 125, and the sampling configuration of capacitor circuit 121. Input signal VIN=Vsig3 (e.g., a signal level for the second "ping" pixel) and the output signal from amplifier circuit 110 is given as Vdiff6=0.

Figure 3D:
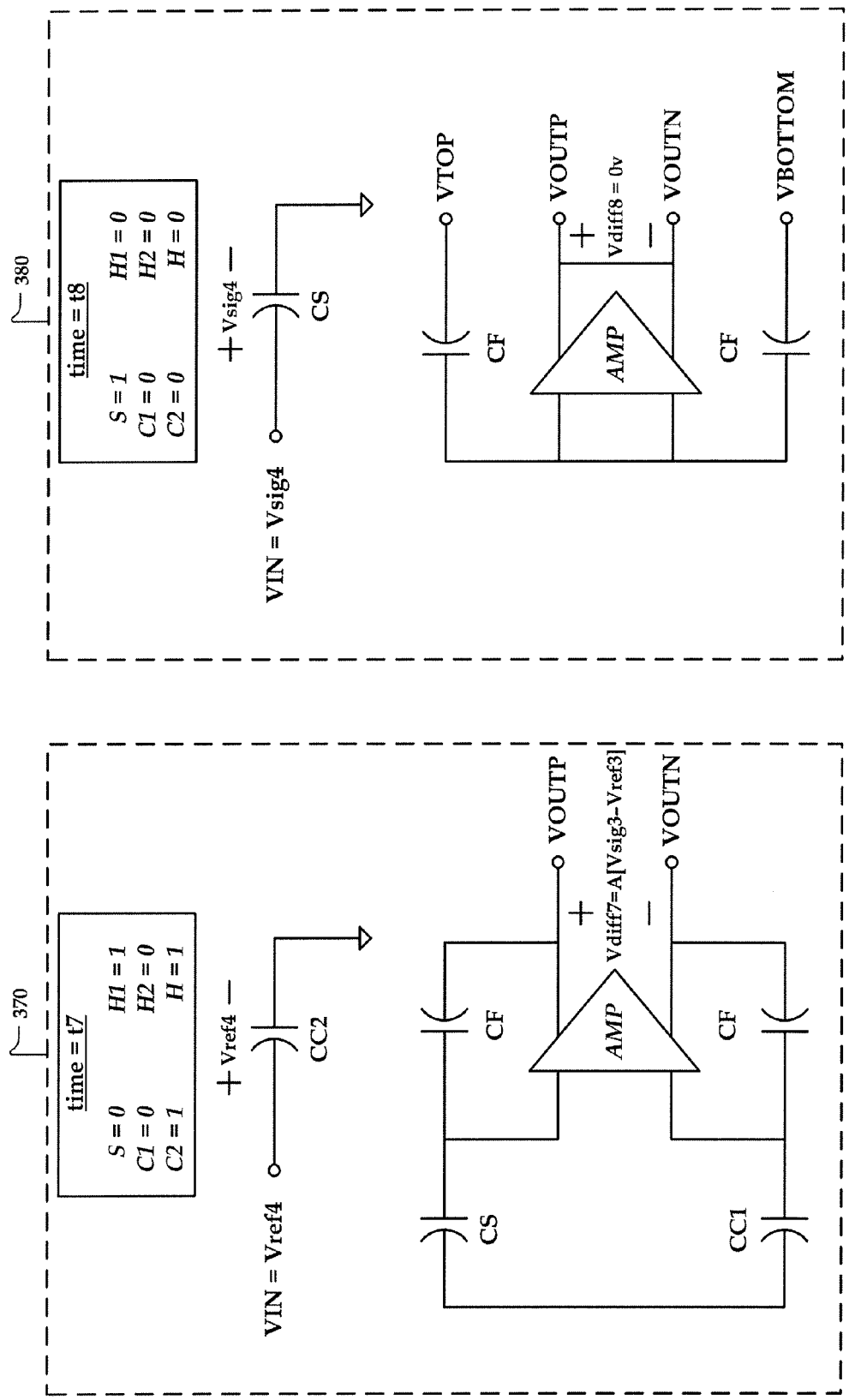

FIG. 3D illustrates a seventh equivalent circuit 370 for CDS circuit 100 at time t7, which is substantially the same as the first equivalent circuit 330 of FIG. 3B where the control signals have logical values S=0, C1=0, C2=1, H1=1, H2=0 and H=1. At time t7, the amplifier circuit 110 is again arranged in the hold configuration with capacitor circuits 121, 122, 124 and 125, and the sampling configuration with capacitor circuit 123. Input signal VIN=Vref4 (e.g., a reference level for a second "pong" pixel) and the output signal from amplifier circuit 110 is given as Vdiff7=A[Vsig3−Vref3].

FIG. 3D also illustrates an eighth equivalent circuit 380 for CDS circuit 100 at time t8, which is substantially the same as the second equivalent circuit 320 of FIG. 3A where the control signals have logical values S=1, C1=0, C2=0, H1=0, H2=0 and H=0. At time t8, the amplifier circuit 110 is again arranged in the initialization configuration with capacitor circuits 124 and 125, and the sampling configuration with capacitor circuit 121. Input signal VIN=Vsig4 (e.g., a signal level for the second "pong" pixel) and the output signal from amplifier circuit 110 is given as Vdiff8=0.

As can be seen by the illustrated example waveforms and equivalent circuits of FIGS. 2A-2G and 3A-3D, the operation of CDS circuit 100 utilizes a ping-pong architecture where the clamp capacitor circuits are alternately selected for each cycle (i.e., capacitor circuit 122 is selected for sampling at times t1 and t5, while capacitor circuit 123 is selected for sampling at times t3 and t6), while the same sample capacitor circuit is utilized for each cycle where the signal level (Vsig) is sampled (i.e., capacitor circuit 121 is selected for sampling at times t2, t4 and t6). Since the described architecture oscillates between the use of the capacitor circuits 122 and 123 as sampling capacitors, then alternating cycles correspond to reference sampling intervals for either the ping cycle or the pong cycle respectively. During the reference sampling interval for a ping pixel, the pong pixel is in a hold cycle. Similarly, during the reference sampling interval for a pong pixel, the ping pixel is in a hold cycle. The process continues and the output of amplifier circuit 110 corresponds to a pipeline of pixel values alternating between ping and pong pixels.

Second Example Configuration

Figure 4A:
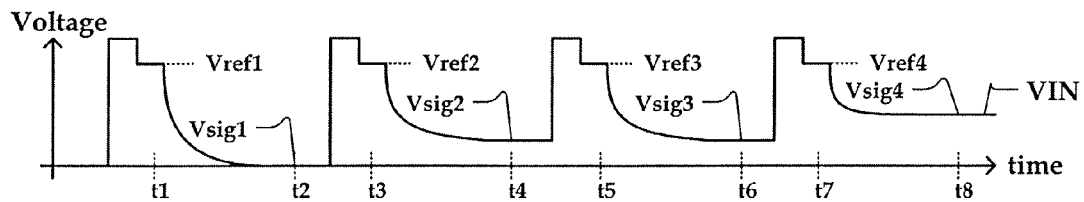
FIGS. 4A-4G are additional timing diagrams that illustrate additional signal waveforms for the correlated double sampler circuit of FIG. 1.
Figure 4B:
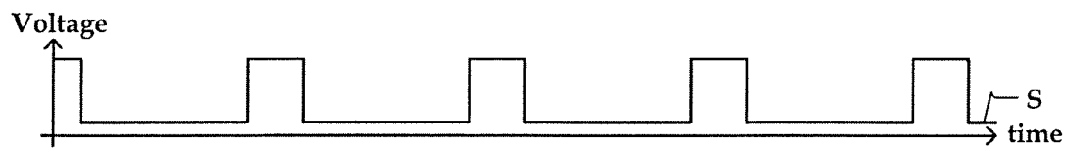
Figure 4C:
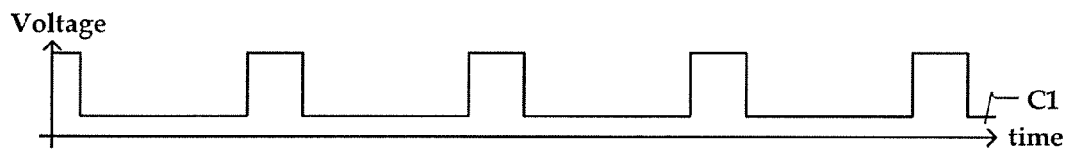
Figure 4D:
Figure 4E:
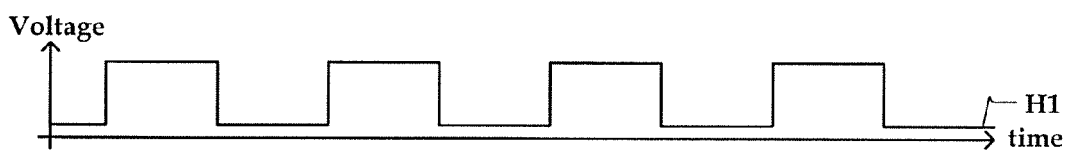
Figure 4F:
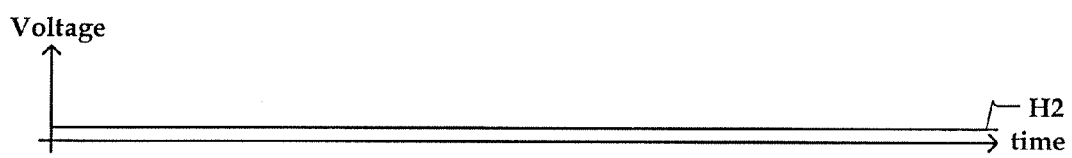
Figure 4G:
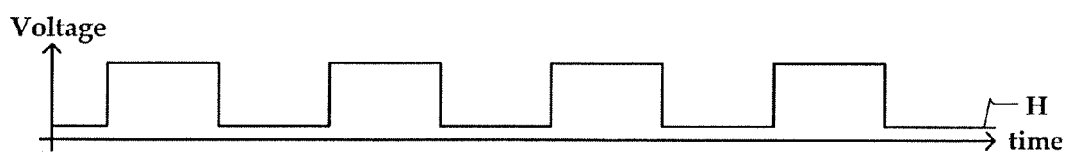

FIGS. 4A-4G are additional timing diagrams that illustrate additional signal waveforms for the correlated double sampler circuit of FIG. 1 when the sample and hold mode is active. FIGS. 4A, 4B and 4G are substantially the same as FIGS. 2A, 2B and 2G, respectively. FIG. 4C illustrates that control signal C1=S from FIG. 4B. FIG. 4D illustrates that control signal C2=0. FIG. 4E illustrates that control signal H1=H. FIG. 4F illustrates that control signal H2=0.

Figure 5A:
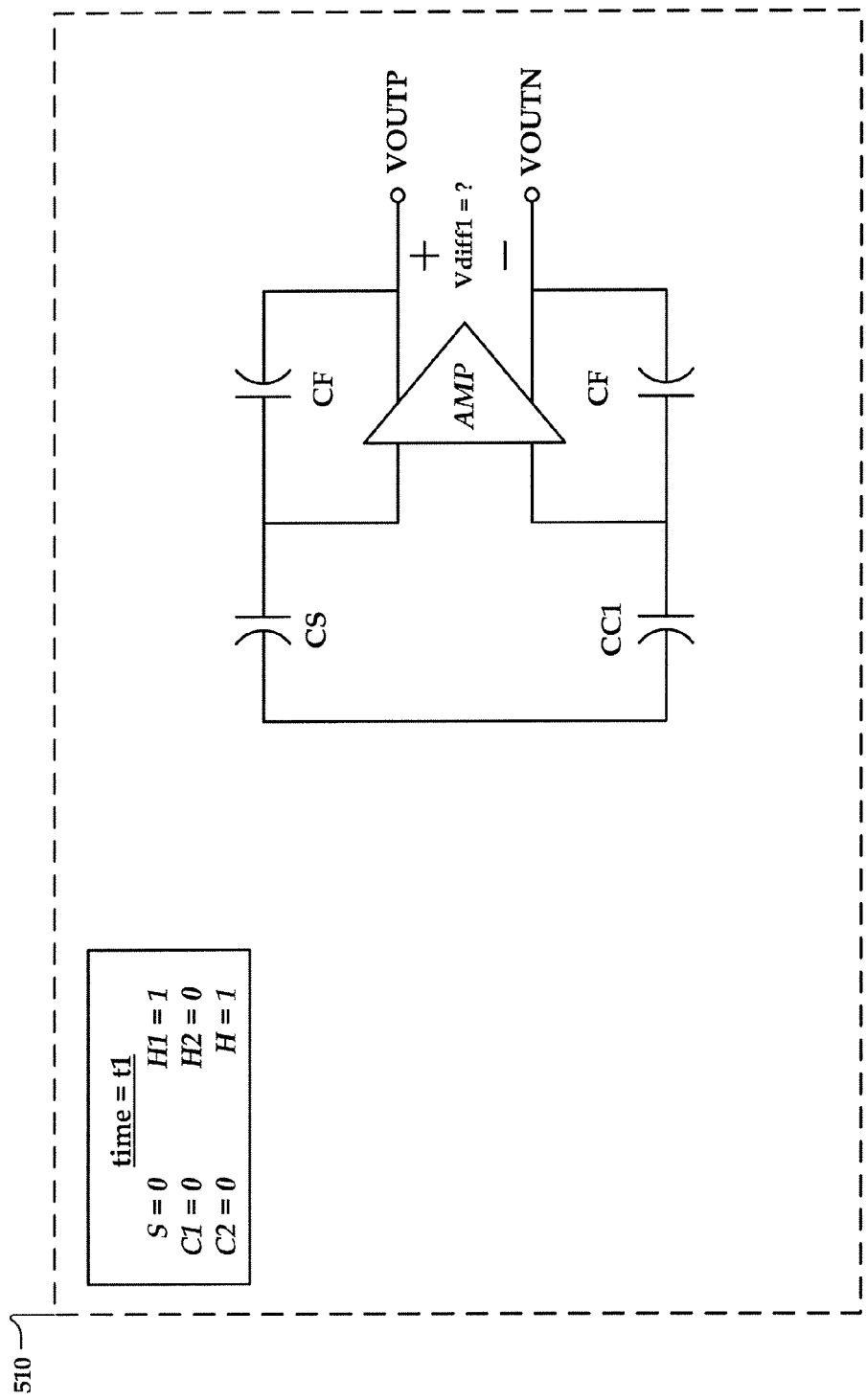
FIGS. 5A-5C are schematic diagrams that illustrate equivalent circuits for the correlated double sampler circuit of FIG. 1 during operation with the signal waveforms of FIGS. 4A-4G.
Figure 5B:
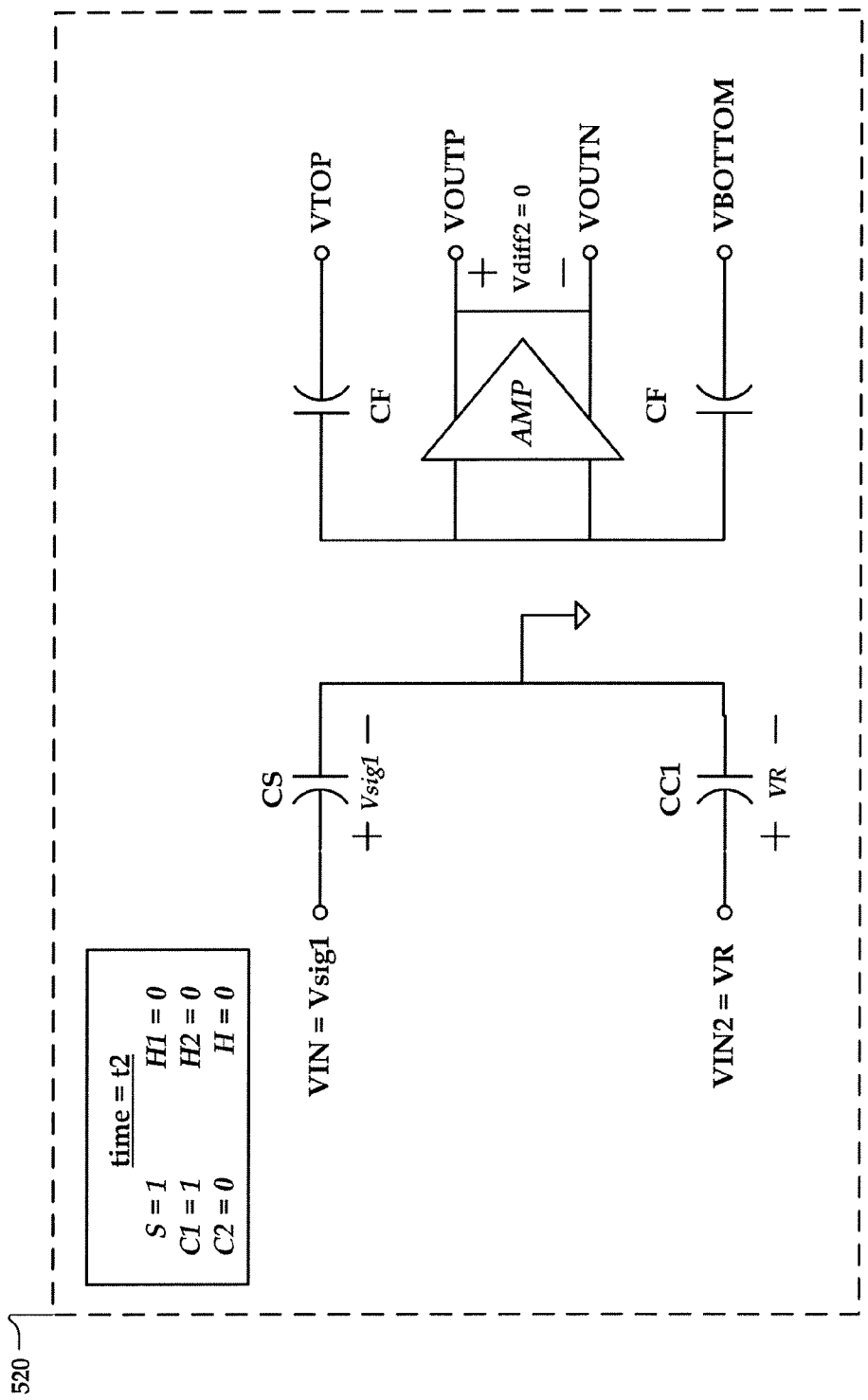
Figure 5C:
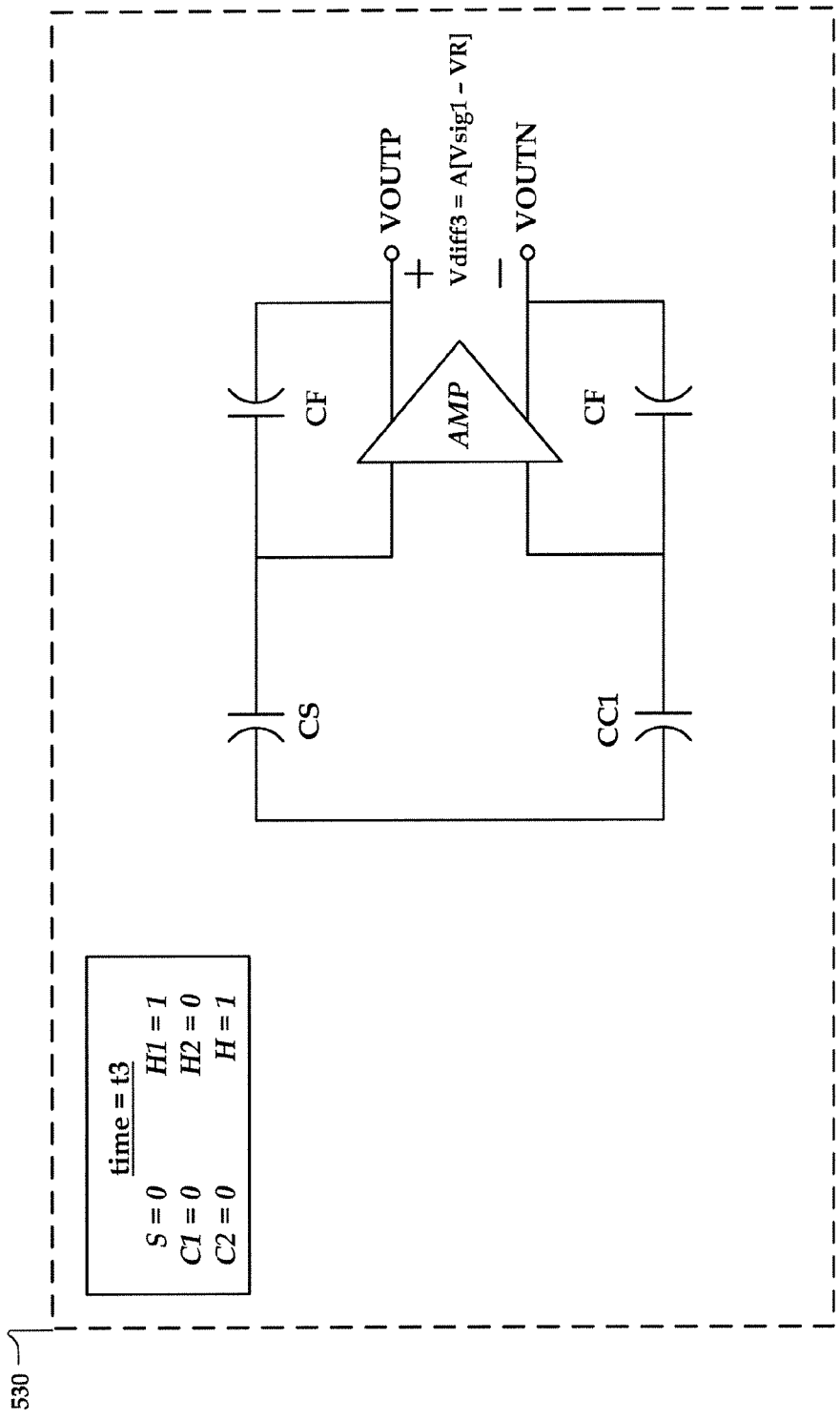

FIGS. 5A-5C are schematic diagrams that illustrate equivalent circuits for the correlated double sampler circuit of FIG. 1 during operation with the signal waveforms of FIGS. 4A-4G.

FIG. 5A illustrates a first equivalent circuit 510 for CDS circuit 100 at time t1, where the control signals have logical values S=0, C1=0, C2=0, H1=1, H2=0 and H=1. At time t1, the amplifier circuit 110 is arranged in a hold configuration with capacitor circuits 121, 122, 124, and 125 that is substantially similar to that previously described above with respect to FIGS. 3A-3D. The difference between VOUTP and VOUTN is determined by the signal level (Vsig), a reference level (VR) of a prior sampling cycle (not shown), and the relative effective capacitance values of the capacitor circuits. Assuming capacitor circuits with equal effective capacitance values (i.e. CS=CF=CC1), the difference (Vdiff1) is determined as Vdiff1=Vsig−VR. As describe previously with respect to FIGS. 3A-3D, the non-varying (i.e., independent of the input signal VIN) or DC component of the difference between VOUTP and VOUTN is considered separate from the difference signal, and is given as: VDC=VTOP−VBOTTOM. Thus, the overall output signal (VOUT) for the CDS circuit 100 in the sample and hold mode is given as: VOUT=VOUTP−VOUTN=Vdiff+VDC. However, for simplicity the DC component is ignored from the remaining discussions, and only the input signal VIN-dependent difference signal Vdiff is described. Also, during the first time (t1), there may be no prior pixel data, and the output (Vdiff) of amplifier circuit 110 at time t1 can be ignored. The reference level VR does not correspond to the reference levels (Vref1-Vref4) from the input signals of FIGS. 2A and 4A. Instead, the reference level VR is provided as a voltage reference that is either user-supplied via an external connection or internally supplied (e.g., from a voltage reference circuit such as a bandgap based voltage reference).

FIG. 5B illustrates a second equivalent circuit 520 for CDS circuit 100 at time t2, where the control signals have logical values S=1, C1=1, C2=0, H1=0, H2=0 and H=0. At time t2, the amplifier circuit 110 is arranged in an initialization configuration with capacitor circuits 124 and 125, similar to that previously described with respect to FIGS. 3A-3D, and also a sampling configuration for capacitor circuits 121 and 122. A first input signal VIN=Vsig1 (the input signal from the pixel) is stored on capacitor circuit 121, while a second input signal VIN2=VR (the reference level which is not from the pixel) is stored on capacitor circuit 122. Also at time t2, the input terminals of the amplifier circuit 110 are shorted together (e.g., via switch circuit 141), the output terminals of the amplifier circuit 110 are shorted together (e.g., via switch circuit 146) and the feedback capacitor circuits 124 and 125 are initialized by voltages VTOP and VBOTTOM, respectively. The voltage difference between the output terminals VOUTP and VOUTN (Vdiff=VOUTP−VOUTN) is determined as Vdiff=0V.

FIG. 5C illustrates a third equivalent circuit 530 for CDS circuit 100 at time t3, which is substantially the same as the first equivalent circuit 510 of FIG. 5A, where the control signals have logical values S=0, C1=0, C2=0, H1=1, H2=0 and H=1. However, at time t3, the previously sampled signal from time t2 are coupled into the feedback configuration of amplifier circuit 110, resulting in an output signal (Vdiff3) that is given as Vdiff3=A[Vsig1−VR], where A is a gain scaling factor that is determined by the relative values of CS to CF (e.g., CS=A*CF).

Example CDS System Configuration

Figure 6:
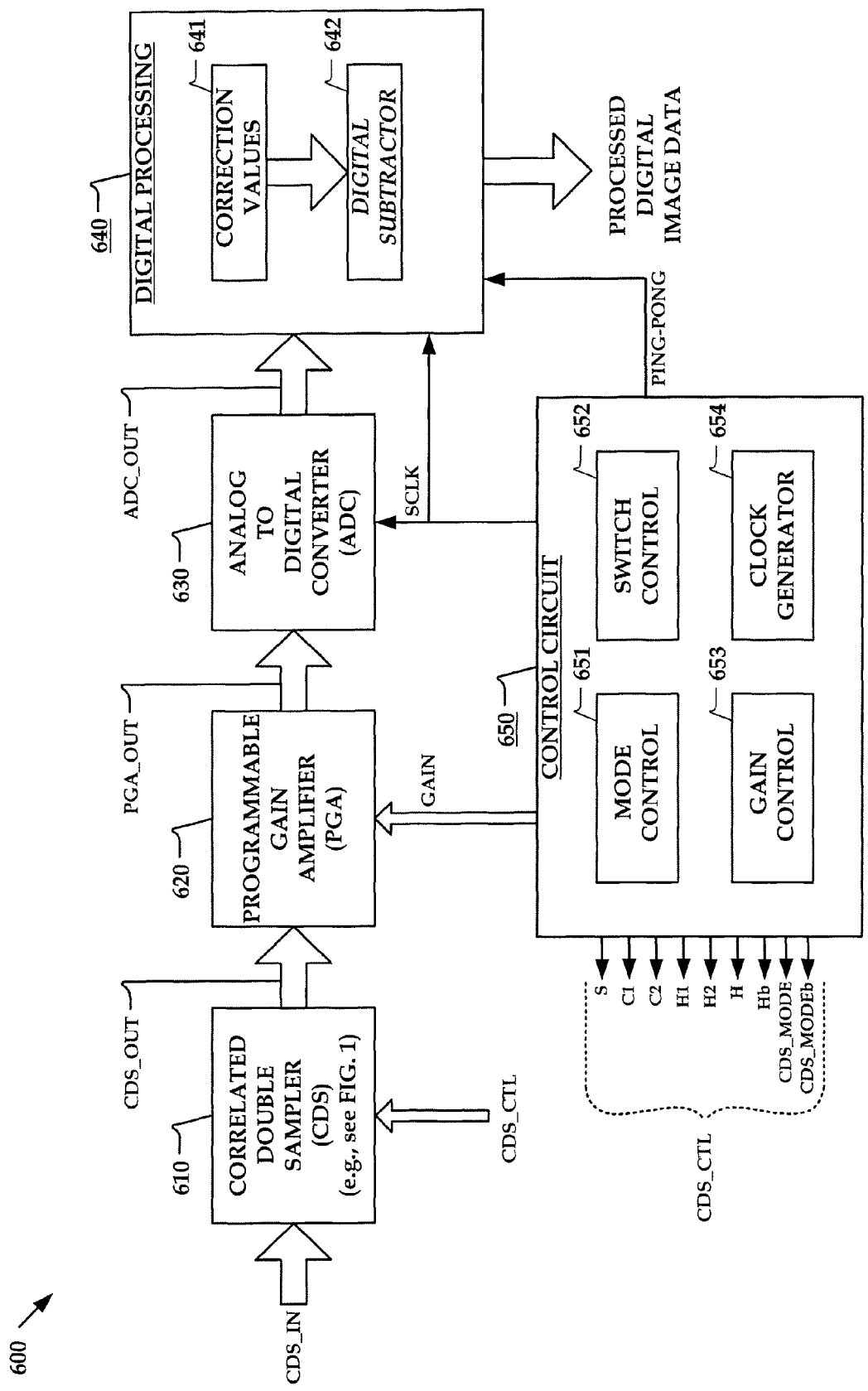
FIG. 6 is a schematic diagram of an image scanning system that is arranged for operation with the correlated double sampler circuit of FIG. 1.

FIG. 6 is a schematic diagram of an image scanning system 600 that is arranged for operation with the correlated double sampler circuit of FIG. 1 configured in accordance with some embodiments of the present disclosure. Image scanning system 600 includes a correlated double sampler (CDS) circuit 610 arranged as described in FIGS. 1-5, a programmable gain amplifier (PGA) circuit 620, an analog-to-digital converter (ADC) 630, a digital processing circuit 640, and a control circuit 650.

CDS circuit 610 includes a signal input terminal for receiving an input signal (VIN), a control input for receiving one or more control signals (CDS_CTL), and a signal output terminal that is arrange to provide an output signal (CDS_OUT). PGA circuit 620 includes a signal input terminal for receiving signal CDS_OUT, a control input terminal for receiving one or more gain control signals (GAIN), and a signal output terminal that is arranged to provide an output signal (PGA_OUT). ADC circuit 630 includes a signal input terminal for receiving signal PGA_OUT, a clock input terminal for receiving a system clock signal (SCLK), and an output terminal that is arranged to provide a digital output signal (ADC_OUT). Digital processing circuit 640 includes a signal input terminal for receiving signal ADC_OUT, a clock input terminal for receiving the system clock signal (SCLK), a control input signal for receiving one or more control signals (PING-PONG), and a signal output terminal that is arranged to provide processed digital image data.

Control circuit 650 includes a first function block for a mode control 651, a second functional block for a switch control 652, a third functional block for a gain control 653, and a fourth functional block for a clock generator 654. Although illustrated as separate functional blocks, the overall functionality of control circuit 650 can be separated into additional function blocks, or combined and integrated into fewer functional blocks as may be desired. In some examples, all of the functional blocks are combined together into a single circuit implementation.

The mode control functional block 651 is arranged to control the operation of the various circuits (610-640) for a variety of operating modes such as CDS mode, sample-hold (S/H) mode, calibration mode, test mode, etc. The switch control functional block 652 is arranged to control the operation of the switch circuits in CDS circuit 610 based on the selected operating mode and the system clock. The gain control functional block 653 is arranged to adjust the gain control signals (GAIN) that are used by PGA circuit 620. The clock generator functional block 654 is arranged to generate the system clock signal (SCLK), which is used by other functional blocks and circuits. Example control signals (CDS_CTL) for CDS circuit 610 can include any number of necessary signals such as, for example, signals S, C1, C2, H1, H2, H and Hb as illustrated in FIGS. 1-5. Also, signal PING-PONG is generated by control circuit 650 to indicate the status of the CDS circuit 610 during operation so that the signal CDS_OUT is known by digital processing circuit 640 as either associated with the "ping" cycle or the "pong" cycle.

Digital processing circuit 640 is arranged to apply correction values 641 to a digital subtractor 642 so that offsets associated with each pixel are digitally removed from the digital image data. For example, amplifier circuit 110 in CDS circuit 100 of FIG. 1 may have an input-referred offset that is present in signal CDS_OUT. Since CDS_OUT utilizes a ping-pong architecture as previously described, alternating cycles of "ping" and "pong" may have different input-referred offsets. The input-referred offsets are determined during a calibration mode, where the input signal YIN is coupled to a signal ground for both alternating cycles of "ping" and "pong." After the input-referred offsets are determined, the image scanning process can be commenced, and the input-referred offsets can be digitally subtracted from the ADC_OUT signal for each pixel based on the cycle status as ping or pong.

Although digital processing circuit 640 is described above with reference to input-referred offsets in amplifier circuit 110, the present disclosure is not so limited. Identical pixels that are processed by the "ping" and "pong" paths in CDS circuit 610 may not be identical due to mismatches resulting from various non-ideal factors (e.g., thermal effects, processing gradients, etc.). Further errors from mismatches can result from increased gain in the CDS circuit 610 and PGA circuit 620. Moreover, additional errors may be introduced by ADC circuit 630. The observed errors can thus include numerous factors from errors introduced in the overall signal path resulting in systematic errors. The effects of mismatches from the "ping" and "pong" signal paths can be calibrated out using digital correction in the digital post-processing section as described. Correction values for each signal path can be statically determined during a calibration cycle or dynamically calculated, such as during the black loop cycle in the imaging system. Half of the correction can be applied to the pixel data from the "ping" cycle, while the other half of the correction can be applied to the pixel data from the "pong" cycle. The various correction values for the digital processing circuit 640 can be stored in a look-up table, a register, or any other means for storing correction values as may be desired.

Example CDS System with Black/White Level Correction

Figure 7:
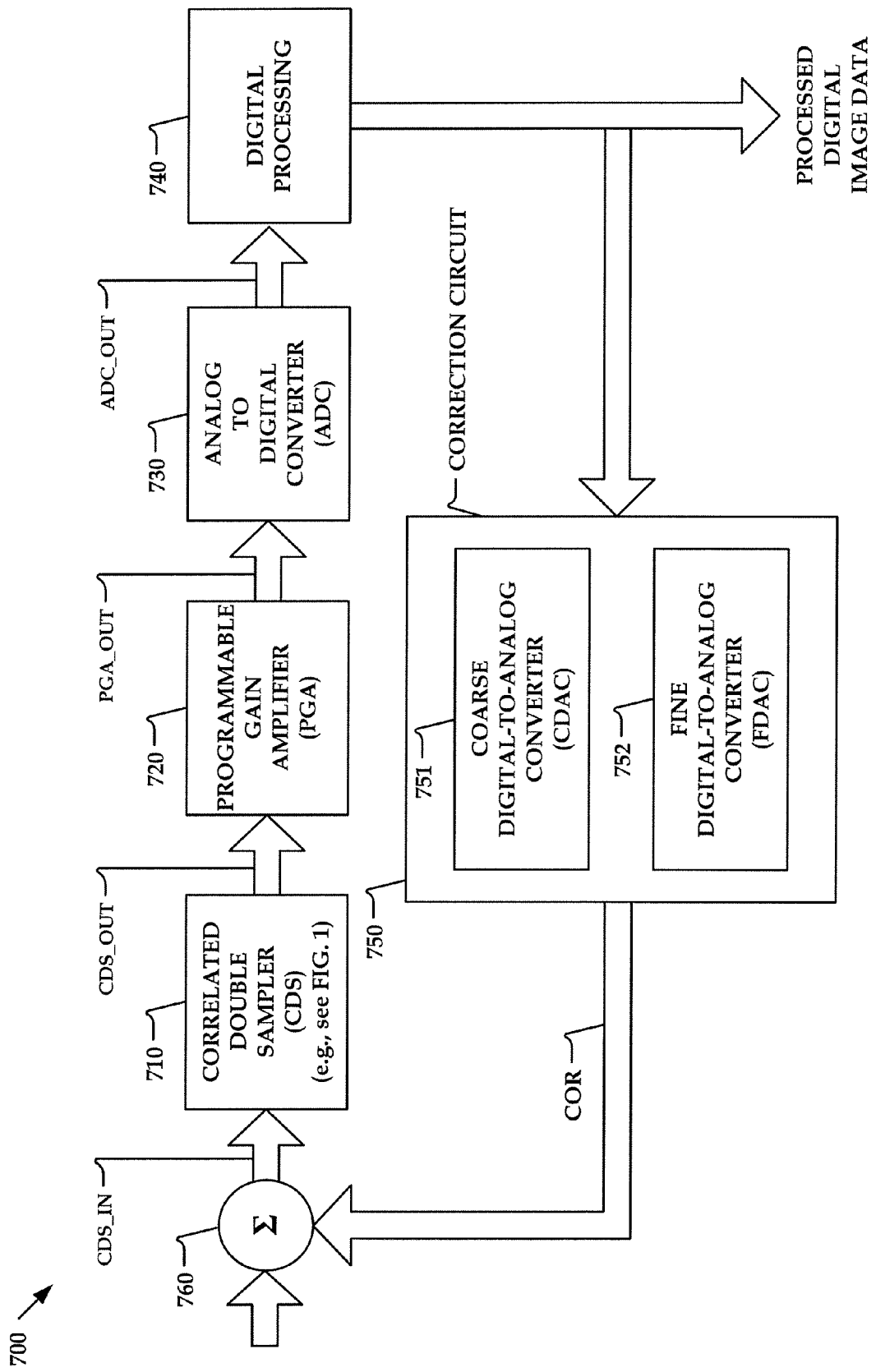
FIG. 7 is a schematic diagram of an image scanning system that is arranged for operation with the correlated double sampler circuit of FIG. 1; all configured in accordance with some embodiments of the present disclosure.

FIG. 7 is a schematic diagram of an image scanning system 700 that is arranged for operation with the correlated double sampler circuit of FIG. 1 configured in accordance with some embodiments of the present disclosure. Image scanning system 700 includes a correlated double sampler (CDS) circuit 710 arranged as described in FIGS. 1-5, a programmable gain amplifier (PGA) circuit 720, an analog-to-digital converter (ADC) 730, and a digital processing circuit 740, arranged identically as circuits 610-640 as previously described for FIG. 6. Image scanning system 700 further includes a correction circuit 750 and a summer circuit 760.

The processed digital image data from digital processing circuit 740 is coupled to an input terminal for correction circuit 750. The correction circuit 750 includes an output terminal that is arranged to provide a correction signal (COR). Summer circuit 760 includes a first input terminal that receives the output of the CCD imaging device, and a second input terminal that receives the correction signal, and an output terminal that corresponds to signal CDS_IN. The summer circuit 760 is arranged to functionally offset the signals from the CCD imaging device so that the black level is adjusted.

The correction signal (COR) can be provided by the correction circuit 750 via one or more digital-to-analog converter (DAC) circuits. For example, a coarse DAC (CDAC) circuit 751 can be combined with a fine DAC (FDAC) 752 to provide the correction signal. The correction signal (COR) can be used to adjust the black level as described above. Moreover, the correction circuit 750 can be arranged to similarly adjust the gain settings of the CDS circuit 710 and/or the PGA circuit 720 as may be desired to adjust the white level.

Comparison of Performance with Conventional CDS Circuits

Figure 8:
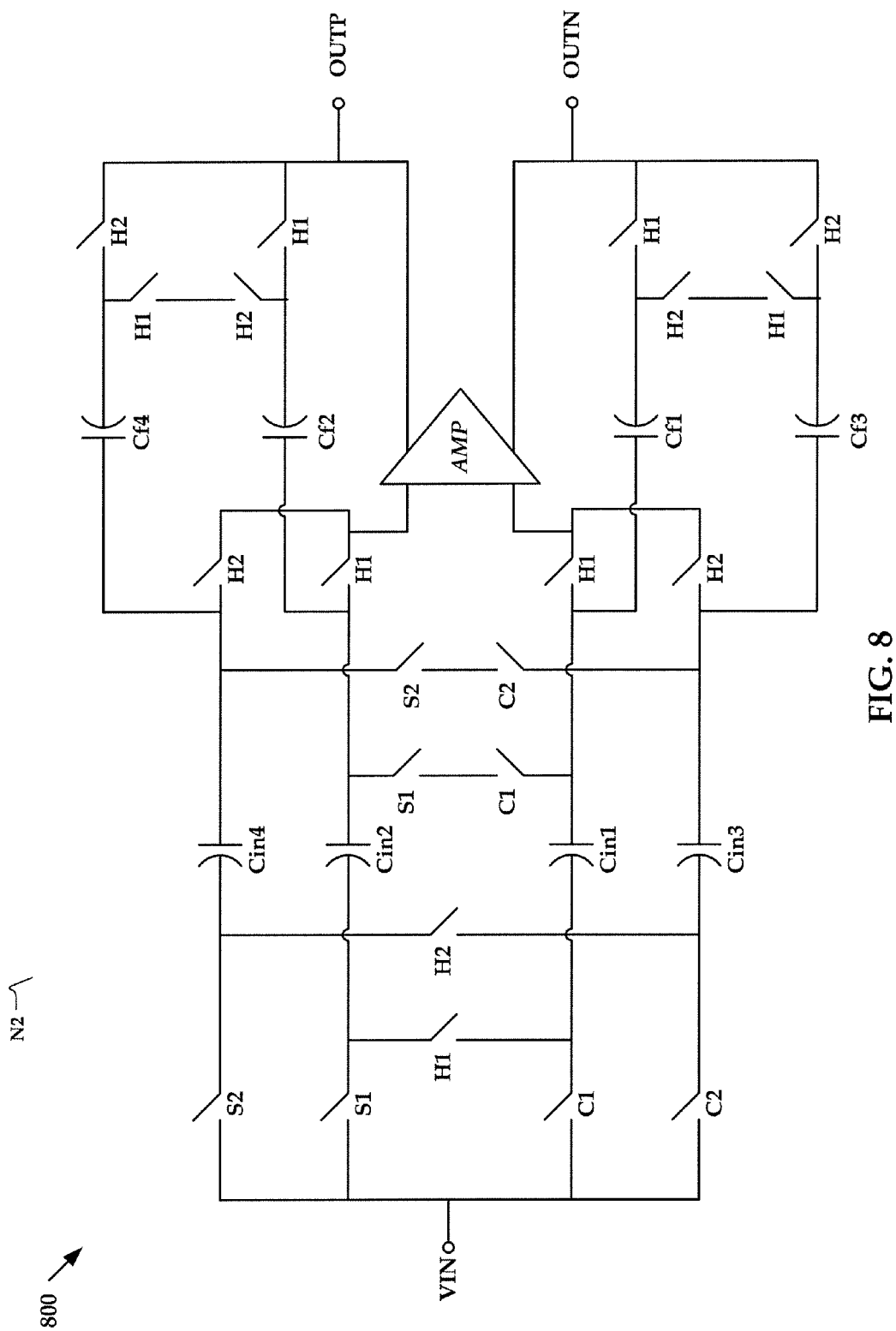
FIG. 8 is a schematic diagram of a conventional correlated double sampler circuit.

FIG. 8 is a schematic diagram of a conventional correlated double sampler (CDS) circuit (800). The illustrated CDS circuit is substantially the same as that described in U.S. Pat. No. 6,587,143, which is hereby incorporated by reference.

As illustrated by FIG. 8, two sampling capacitors (Cin2, Cin4) are used to sample the input signal level (e.g., Vsig) when switches are closed in response to signals S1 and S2, respectively; and two different sampling capacitors (Cin1, Cin3) are used to sample the input reference level or reset level (Vref) when switches are closed in response to signals C1 and C2, respectively. Signals S1 and S2 are operated in a ping-pong format so that sampling for one sampled input signal occurs during a hold phase for another sampled input signal. Signals C1 and C2 are similarly operated in a ping-pong format so that sampling for one sampled reference level occurs during a hold phase for another sampled reference level.

Also illustrated in FIG. 8, four feedback capacitors (Cf1-Cf4) are arranged in the feedback loop of the amplifier. The first feedback capacitor (Cf1) and the first sampling capacitor (Cin1) are arranged to hold previously sampled reference level from sampling capacitor Cin1, while the second feedback capacitor (Cf2) and the sampling capacitor (Cin2) holds the previously sampled input signal level, both when signal H1 is asserted. The third feedback capacitor (Cf3) and the third sampling capacitor (Cin3) are arranged to hold a different previously sampled reference level from sampling capacitor Cin3, while the fourth feedback capacitor (Cf4) and the fourth sampling capacitor (Cin4) holds the previously sampled input signal level, both when signal H2 is asserted. H1 in this instance corresponds to the hold signal for one operating phase (e.g., ping), while H2 corresponds to the hold signal for another operating phase (e.g., pong).

The conventional CDS circuit 800 has an inherent gain and offset mismatch error that is difficult to eliminate. This is partially a result of the large number of capacitors (Cin1-Cin4, and Cf1-Cf4) that are necessary to provide sampling and holding functions in the described ping-pong arrangement of U.S. Pat. No. 6,587,143. For example, capacitors Cin1-Cin4 may have values that do not match one another resulting in one form of error, while capacitors Cf1-Cf4 may not match one another. Moreover, mismatches in the relative sizes of the input sampling capacitors (Cin1-Cin4) and the feedback capacitors (Cf1-Cf4) may result in gain errors. The output voltages associated with one sampling phase (e.g., the ping phase) may be expressed as Vping, while the output voltage of the CDS circuit 800 may be expressed as Vpong, as given by:

$$Vping=Vref[Cin1/Cf1]+Vsig[Cin2/Cf2] \quad (1)$$

$$Vpong=Vreg[Cin3/Cf3]+Vsig[Cin4/Cf4] \quad (2)$$

$$Vpong\_error=Vpong-Vping \quad (3)$$

Substituting equations (1) and (2) into equation (3) yields:

$$Vpong\_error=Vref[(Cin1/Cf1)-(Cin3/Cf3)]+Vsig[(Cin2/Cf2)-(Cin4/Cf4)] \quad (4)$$

The error (Vpong_error) described above illustrates that one error term results from an offset that is systematically proportional to Vref, while a second error term is dependent upon the input signal Vsig. Ideally the values for the first error term have matched capacitors (i.e., Cin1=Cin3 and Cf1=Cf3) so that the first error term is zero; and the values for the second error term also have matched capacitors (i.e., Cin2=Cin4 and Cf1=Cf4) so that the second error term is zero. However, due to non-ideal effects the capacitor values may not be perfectly matched resulting in the above described error terms. Some terms such as the above described offset term may result in a systematic offset that can be accounted for by calibration and other error reducing measures. However, it is very complex and difficult to adjust for gain mismatches that are signal dependent such as described above.

Referring now to the circuits described with respect to FIGS. 1-7, the equations for Vping, Vpong, and Vpong_error can be expressed as follows:

$$Vping=Vref[CC1/CF1]+Vsig[CS/CF2] \quad (5)$$

$$Vpong=Vref[CC2/CF1]+Vsig[CS/CF2] \quad (6)$$

Substituting equations (5) and (6) into equation (3) yields:

$$Vpong\_error=Vref[(CC1/CF1)-(CC2/CF1)]+0 \quad (7)$$

As illustrated above, the CDS circuit described with respect to FIGS. 1-7 does not have any error term that is signal dependent, and instead only has a single error term that is related to the reference signal level as an offset. Since the only error term that is observed is an offset, the offset can be easily measured using the existing circuitry of the described system (e.g., see FIGS. 6-7), and the error term can be digitally subtracted as previously described.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An apparatus for processing an analog input signal, the apparatus comprising:
a first reference sampling capacitor circuit that is arranged for sampling the analog input signal at a first time to provide a first sampled reference level;
a second reference sampling capacitor circuit that is arranged for sampling the analog input signal at a third time to provide a second sampled reference level, wherein the third time is subsequent to the first time;
an input sampling capacitor circuit that is arranged for sampling the analog input signal at a second time between the first time and the third time to provide a first sampled input signal level, wherein the input sampling capacitor circuit is also arranged for sampling the analog input signal at a fourth time subsequent to the third time to provide a second sampled input signal level;
an amplifier circuit that is dynamically configured in one of a first hold configuration, a second hold configuration, and an initialization configuration, wherein a differential output of the amplifier circuit is substantially zero in the initialization configuration, and wherein the differential output of the amplifier circuit in the first hold configuration and in the second hold configuration is dependent upon the analog input signal as sampled; and first and second feedback capacitor circuits that are arranged in cooperation with the first and second reference sampling capacitor circuits, the input sampling capacitor circuit, and the amplifier circuit such that:

the differential output corresponds to a difference between the first sampled input signal level and the first sampled reference level at the third time; and the differential output corresponds to a difference between the second sampled input signal level and the second sampled reference level at a fifth time subsequent to the fourth time.

2. The apparatus of claim 1, wherein the input sampling capacitor circuit comprises:

a first switch circuit that is arranged to selectively couple the analog input signal to a first terminal of a first capacitor circuit at the second time and the fourth time; and a second switch circuit that is arranged to selectively couple a second terminal of the first capacitor circuit to a signal ground at the second time and the fourth time;

wherein the first capacitor circuit is arranged to sample the analog input signal at the second time and the fourth time.

3. The apparatus of claim 2, wherein the first reference sampling capacitor circuit comprises:

a third switch circuit that is arranged to selectively couple the analog input signal to a first terminal of a second capacitor circuit at the first time and the fifth time; and a fourth switch circuit that is arranged to selectively couple a second terminal of the second capacitor circuit to the signal ground at the first time and the fifth time;

wherein the second capacitor circuit is arranged to sample the analog input signal at the first time and the fifth time.

4. The apparatus of claim 3, wherein the second reference sampling capacitor circuit comprises:

a fifth switch circuit that is arranged to selectively couple the analog input signal to a first terminal of a third capacitor circuit at the third time; and a sixth switch circuit that is arranged to selectively couple a second terminal of the third capacitor circuit to the signal ground at the third time;

wherein the third capacitor circuit is arranged to sample the analog input signal at the third time.

5. The apparatus of claim 1, wherein the input sampling capacitor circuit, the first reference sampling capacitor circuit, and the second reference sampling capacitor circuit include capacitor circuits with effective capacitance values matched to one another.

6. The apparatus of claim 5, wherein the first feedback capacitor circuit and the second feedback capacitor circuit include second capacitor circuits with effective capacitance values matched to one another.

7. The apparatus of claim 6, wherein the effective capacitance values associated with the input sampling capacitor circuit, the first reference sampling capacitor circuit, the second reference sampling capacitor circuit, the first feedback capacitor circuit, and the second feedback capacitor circuit are matched to one another.

8. The apparatus of claim 1, further comprising:

a control circuit that is arranged to provide control signals to selectively control operation of the input sampling capacitor circuit, the first reference sampling capacitor circuit, the second reference sampling capacitor circuit, the first feedback capacitor circuit, and the second feedback capacitor circuit.

9. The apparatus of claim 1, wherein the first sampled reference level is matched to the second sampled reference level.

10. A method for processing an analog input signal, the method comprising:

sampling the analog input signal at a first time with a first capacitor circuit to provide a first sampled reference level;

sampling the analog input signal at a second time subsequent to the first time with a second capacitor circuit to provide a first sampled input signal level;

sampling the analog input signal at a third time subsequent to the second time with a third capacitor circuit to provide a second sampled reference level;

sampling the analog input signal at a fourth time subsequent to the third time with the second capacitor circuit to provide a second sampled input signal level;

coupling a fourth capacitor circuit in series with the first capacitor circuit during a first hold phase at the third time, wherein the fourth capacitor circuit is arranged in a first feedback loop of a fully differential amplifier circuit;

coupling a fifth capacitor circuit in series with the second capacitor circuit during the first hold phase at the third time, wherein the fifth capacitor circuit is arranged in a second feedback loop of the fully differential amplifier circuit;

coupling the fourth capacitor circuit in series with the third capacitor circuit during a second hold phase at a fifth time subsequent to the fourth time;

coupling the fifth capacitor circuit in series with the second capacitor circuit during the second hold phase at the fifth time; and generating a differential output signal with the fully differential amplifier circuit during the first hold phase and the second hold phase;

wherein the differential output signal corresponds to a difference between the first sampled reference level and the first sampled input signal level during the first hold phase; and wherein the differential output signal corresponds to a difference between the second sampled reference level and the second sampled input signal level during the second hold phase.

11. The method of claim 10, further comprising:

adjusting a gain of the differential output signal with a programmable gain amplifier (PGA) circuit that is arranged to provide an adjusted gain differential output signal in response thereto.

12. The method of claim 11, further comprising:

converting the adjusted gain differential output signal to a digital output signal with an analog-to-digital converter (ADC) circuit.

13. The method of claim 12, further comprising:

subtracting correction values from the digital output signal with a digital processing circuit to provide processed digital image data.

14. The method of claim 12, further comprising:

subtracting correction values from an analog input data stream to generate the analog input signal.

15. An apparatus for processing an analog input signal, the apparatus comprising:

a first switch circuit that is coupled between a first node and a second node, wherein the first switch circuit is arranged to be responsive to a first sampling control signal, wherein the first node is arranged to receive the analog input signal;

a multiplexer circuit that includes a first input coupled to the first node, a second input coupled to an eighteenth node, an output coupled to a seventeenth node, and a control terminal that is arranged to be responsive to a mode control signal;

a second switch circuit that is coupled between the seventeenth node and a third node, wherein the second switch circuit is arranged to be responsive to a second sampling control signal;

a third switch circuit that is coupled between the seventeenth node and a fourth node, wherein the second switch circuit is arranged to be responsive to a third sampling control signal;

a fourth switch circuit that is coupled between the second node and the third node, wherein the fourth switch circuit is arranged to be responsive to a first hold control signal;

a fifth switch circuit that is coupled between the second node and the fourth node, wherein the fifth switch circuit is arranged to be responsive to a second hold control signal;

a sixth switch circuit that is coupled between a fifth node and a sixth node, wherein the sixth switch circuit is arranged to be responsive to the first sampling control signal;

a seventh switch circuit that is coupled between the fifth node and a seventh node, wherein the seventh switch circuit is arranged to be responsive to the second sampling control signal;

an eighth switch circuit that is coupled between the fifth node and an eighth node, wherein the eighth switch circuit is arranged to be responsive to the third sampling control signal;

a ninth switch circuit that is coupled between the sixth node and a tenth node, wherein the ninth switch circuit is arranged to be responsive to a third hold control signal, wherein the third hold control signal is asserted at a same time as either of the first hold control signal or the second hold control signal;

a tenth switch circuit that is coupled between the seventh node and a ninth node, wherein the tenth switch circuit is arranged to be responsive to the first hold control signal;

an eleventh switch circuit that is coupled between the eighth node and the ninth node, wherein the eleventh switch circuit is arranged to be responsive to the second hold control signal;

a twelfth switch circuit that is coupled between the ninth node and the tenth node, wherein the twelfth switch circuit is arranged to be responsive to the first sampling control signal;

a thirteenth switch circuit that is coupled between a twelfth node and a fourteenth node, wherein the thirteenth switch circuit is arranged to be responsive to the third hold control signal;

a fourteenth switch circuit that is coupled between an eleventh node and a thirteenth node, wherein the fourteenth switch circuit is arranged to be responsive to the third hold control signal;

a fifteenth switch circuit that is coupled between the thirteenth node and the fourteenth node, wherein the fifteenth switch circuit is arranged to be responsive to an inverse of the third hold control signal;

a first capacitor circuit that is coupled between the second node and the sixth node;

a second capacitor circuit that is coupled between the third node and the seventh node;

a third capacitor circuit that is coupled between the fourth node and the eighth node;

a fourth capacitor circuit that is coupled between the tenth node and the twelfth node;

a fifth capacitor circuit that is coupled between the ninth node and the eleventh node;

a fully differential amplifier circuit that includes a first input terminal coupled to the ninth node, a second input terminal coupled to the tenth node, a first output terminal coupled to the thirteenth node, and a second output terminal coupled to the fourteenth node; and a control circuit that is arranged to selectively control the mode control signal, the first sampling control signal, the second sampling control signal, the third sampling control signal, the first hold control signal, the second hold control signal, and the third hold control signal.

16. The apparatus of claim 15, wherein the control circuit is arranged to:
assert the second sampling control signal, the second hold control signal, and the third hold control signal at a first time;
assert the first sampling control signal at a second time subsequent to the first time;
assert the third sampling control signal, the first hold control signal, and the third hold control signal at a third time subsequent to the second time;
assert the first sampling control signal at a fourth time subsequent to the third time; and
assert the second sampling control signal, the second hold control signal, and the third hold control signal at a fifth time subsequent to the fourth time.

17. The apparatus of claim 16, wherein the control circuit is arranged to control the switch circuits and the capacitor circuits in order to:
obtain a first sampled reference level at the first time;
obtain a first sampled input signal level at the second time;
obtain a second sampled reference level at the third time; and
obtain a second sampled input signal level at the fourth time; and
wherein the amplifier circuit is arranged to output a differential output signal that:
corresponds to a difference between the first sampled reference level and the first sampled input signal level during a first hold phase at the third time; and
corresponds to a difference between the second sampled reference level and the second sampled input signal level during a second hold phase at the fifth time.

18. The apparatus of claim 15, wherein the fifth node is configured as a signal ground terminal that corresponds to one of: a common-mode voltage, a mid-supply voltage, a ground voltage, and a regulated voltage.

19. The apparatus of claim 15, further comprising:
a sixteenth switch circuit coupled between the twelfth node and a sixteenth node, wherein the sixteenth switch circuit is arranged to be responsive to the inverse of the third hold control signal; and
a seventeenth switch circuit that is coupled between the eleventh node and a fifteenth node, wherein the seventeenth switch circuit is arranged to be responsive to the inverse of the third hold control signal;
wherein the fifteenth node is associated with a first DC voltage, and wherein the sixteenth node is associated with a second DC voltage.

20. The apparatus of claim 15, wherein:
the control circuit is arranged to assert the mode control signal when the apparatus is configured in a correlated double sampling mode and de-assert the mode control signal when the apparatus is configured in a sample and hold mode; and
the multiplexer circuit is arranged to:
couple the first node to the seventeenth node in the correlated double sampling mode;
isolate the first node from the seventeenth node in the sample and hold mode;
couple the seventeenth node to the eighteenth node in the sample and hold mode; and
isolate the seventeenth node from the eighteenth node in the correlated double sampling mode.

* * * * *